(12) United States Patent
Haga et al.

(10) Patent No.: US 12,509,601 B2
(45) Date of Patent: Dec. 30, 2025

(54) AQUEOUS INK COMPOSITION FOR WRITING INSTRUMENTS

(71) Applicant: MITSUBISHI PENCIL COMPANY, LIMITED, Shinagawa-ku (JP)

(72) Inventors: Hisato Haga, Shinagawa-ku (JP); Kensuke Inoue, Fujioka (JP)

(73) Assignee: MITSUBISHI PENCIL COMPANY, LIMITED, Shinagawa-ku (JP)

( * ) Notice: Subject to any disclaimer, the term of this patent is extended or adjusted under 35 U.S.C. 154(b) by 570 days.

(21) Appl. No.: 17/996,653

(22) PCT Filed: Apr. 26, 2021

(86) PCT No.: PCT/JP2021/016658
§ 371 (c)(1),
(2) Date: Oct. 20, 2022

(87) PCT Pub. No.: WO2021/225086
PCT Pub. Date: Nov. 11, 2021

(65) Prior Publication Data
US 2023/0250304 A1 Aug. 10, 2023

(30) Foreign Application Priority Data
May 7, 2020 (JP) .................................. 2020-081880

(51) Int. Cl.
*C09D 11/17* (2014.01)
*C09B 67/46* (2006.01)

(52) U.S. Cl.
CPC .......... *C09D 11/17* (2013.01); *C09B 67/0084* (2013.01)

(58) Field of Classification Search
CPC ..... C09D 11/17; C09D 11/18; C09B 67/0084; C09B 67/009
See application file for complete search history.

(56) References Cited

U.S. PATENT DOCUMENTS

| 2018/0079920 A1* | 3/2018 | Haga | C09D 11/17 |
| 2019/0211220 A1* | 7/2019 | Miyoshi | B43K 7/00 |
| 2020/0347251 A1 | 11/2020 | Haga | |
| 2021/0316566 A1 | 10/2021 | Kamitani | |

FOREIGN PATENT DOCUMENTS

| JP | 2004-277448 A | 10/2004 | |
| JP | 2009-114398 A | 5/2009 | |
| JP | 2010-280833 A | 12/2010 | |
| JP | 2012-67210 A | 4/2012 | |
| JP | 2018-35204 A | 3/2018 | |
| JP | 2018-119061 A | 8/2018 | |
| JP | 2019-112561 A | 7/2019 | |
| JP | 2019-196438 A | 11/2019 | |
| JP | 2020-33537 A | 3/2020 | |
| WO | WO-2018042818 A1 * | 3/2018 | ............... B43K 7/00 |
| WO | WO 2019/131491 A1 | 7/2019 | |
| WO | WO 2020/032104 A1 | 2/2020 | |

OTHER PUBLICATIONS

International Search Report mailed on Jul. 13, 2021 in PCT/JP2021/016658, filed on Apr. 26, 2021, 3 pages).

* cited by examiner

*Primary Examiner* — Doris L Lee
(74) *Attorney, Agent, or Firm* — Oblon, McClelland, Maier & Neustadt, L.L.P.

(57) ABSTRACT

An aqueous ink composition for writing instruments containing an aqueous dispersion of colored resin fine particles, the colored resin fine particles containing at least a cyclohexyl (meth)acrylate monomer and a basic dye or an oil-soluble dye, the cyclohexyl (meth)acrylate monomer being contained in an amount of 30 mass % or greater relative to an amount of a polymerizable polymer component in the colored resin fine particles, and the colored resin fine particles further containing a terpene phenol resin.

20 Claims, No Drawings

AQUEOUS INK COMPOSITION FOR WRITING INSTRUMENTS

CROSS REFERENCE TO RELATED APPLICATIONS

This application is a National Stage entry under 35 U.S.C. § 371 of PCT/JP2021/16658, filed on Apr. 26, 2021, and claims priority to Japanese Patent Application No. 2020-081880, filed on May 7, 2020. The entire contents of both are incorporated herein by reference.

TECHNICAL FIELD

The present description relates to an aqueous ink composition for writing instruments, the aqueous ink composition containing resin fine particles that have been colored with a dye as a colorant.

BACKGROUND ART

An aqueous ink composition for writing instruments containing resin particles that have been colored with a dye as a colorant is known. For example, the following are known: 1) a dispersion liquid of colored resin fine particles for an aqueous ink, in which the colored resin fine particles containing at least a cyclohexyl (meth)acrylate monomer, and a basic dye or an oil-soluble dye are dispersed in water, the colored resin fine particles having an cyclohexyl (meth) acrylate monomer content of 30 mass % or greater relative to a total polymer component in the colored resin fine particles, and a basic dye or oil-soluble dye content of 15 mass % or greater relative to the total polymer component (e.g., see Patent Document 1); and 2) an aqueous ink composition for writing instruments, the aqueous ink composition containing a water, colored microspheres each containing a matrix composed of a polymer and a water-insoluble dye, and non-colored microspheres. The colored microspheres further contain a resin having an OH group such as terpene phenol resins (e.g., see Patent Document 2).

However, while an aqueous ink composition for writing instruments containing resin particles that have been colored with a dye as a colorant described in Patent Documents 1 and 2 above achieved excellent, novel writing performance, on some occasions, bleeding of drawn lines occurred over time. Although the reason is not clear, it is presumed that a component constituting paper draws the dye (transferring the dye). Furthermore, with respect to the colored microspheres of Patent Document 2 above encapsulating a terpene phenol resin and the like, Patent Document 2 indicates a technology close to the present invention; however, it differs in the polymer components constituting the particles, as well as the functions and effects.

CITATION LIST

Patent Document

Patent Document 1: JP 2019-112561 A (e.g., Claims, Examples)
Patent Document 2: WO 2018/042818 (e.g., Claims, Examples)

SUMMARY OF INVENTION

Technical Problem

In light of the known problems described above, the present disclosure is to solve these problems, and an object is to provide an aqueous ink composition for writing instruments having excellent writing performance without bleeding of drawn lines even when the aqueous ink composition for writing instruments contains resin fine particles that have been colored with a dye as a colorant.

Solution to Problem

In light of the known problems described above, the inventors of the present invention conducted diligent research and found that the aqueous ink composition for writing instruments that has been sought for the described object can be obtained by blending an aqueous dispersion of colored resin fine particles that contain at least a cyclohexyl (meth)acrylate monomer, and a basic dye or an oil-soluble dye, with the colored resin fine particles further containing a specific resin and with the cyclohexyl (meth)acrylate monomer being contained in a predetermined range or greater, and thus completed the present disclosure.

That is, the aqueous ink composition for writing instruments of the present disclosure contains an aqueous dispersion of colored resin fine particles, the colored resin fine particles containing at least a cyclohexyl (meth)acrylate monomer and a basic dye or an oil-soluble dye, the cyclohexyl (meth)acrylate monomer being contained in an amount of 30 mass % or greater relative to an amount of a polymerizable polymer component in the colored resin fine particles, and the colored resin fine particles further containing a terpene phenol resin.

In taking a content of the terpene phenol resin in the colored resin fine particles as A and a content of the polymerizable polymer component in the colored resin fine particles as B, $A/(A+B)$ is preferably 0.05 to 0.5.

The content of the cyclohexyl (meth)acrylate monomer is preferably 30 mass % to 95 mass % relative to the amount of the polymerizable polymer component in the colored resin fine particles.

The colored resin fine particles preferably have an average particle size of 20 to 300 nm.

Advantageous Effects of Invention

According to the present disclosure, an aqueous ink composition for writing instruments having excellent writing performance without bleeding of drawn lines even after time passed, even when the aqueous ink composition for writing instruments contains resin particles that have been colored with a dye as a colorant, is provided.

In the present specification, both of general explanation described above and detailed explanation described below are exemplification and explanation and do not limit the present disclosure described in Claims.

DESCRIPTION OF EMBODIMENTS

At least some embodiments of the present disclosure will be described in detail below. However, note that the technical scope of the present disclosure is not limited to the embodiments described below and includes the invention described in Claims and equivalents thereof.

The aqueous ink composition for writing instruments of the present disclosure contains an aqueous dispersion of colored resin fine particles, the colored resin fine particles containing at least a cyclohexyl (meth)acrylate monomer, and a basic dye or an oil-soluble dye, a content of the cyclohexyl (meth)acrylate monomer being contained in an amount of 30 mass % or greater relative to an amount of a polymerizable polymer component in the colored resin fine particles, and the colored resin fine particles further containing a terpene phenol resin.

The cyclohexyl (meth)acrylate monomer to be used in the present disclosure is available due to the merit of enabling to achieve stable colored resin fine particles which are intense in color development, and of allowing the obtained colored resin fine particles to have a sufficient intensity in a drawn line as a coloring material for writing instruments, even with increased amount of the dye to be incorporated. The "(meth)acrylic acid" represents "acrylic acid and/or methacrylic acid". In addition, the method of producing a cyclohexyl (meth)acrylate monomer is known, and a cyclohexyl (meth)acrylate can be produced by the known method, for example, a method of esterifying (meth)acrylic acid and cyclohexanol by using a catalyst such as an inorganic acid, an organic sulfonic acid, or a strong acid ion exchange resin, or an ester exchange method using an organic metal compound containing titanium, tin, or the like as a catalyst.

In the present disclosure, in addition to the cyclohexyl (meth)acrylate monomer described above, a hydrophobic vinyl monomer other than the cyclohexyl (meth)acrylate monomer, and an aqueous monomer can be preferably used in terms of obtaining colored resin fine particles having excellent color development.

As the hydrophobic vinyl monomer, for example, at least one of monomers such as esters of acrylic acid or methacrylic acid other than the cyclohexyl (meth)acrylate monomer, styrenes such as styrene and methyl styrene can be used.

The hydrophobic vinyl monomer that can be used includes, for example, at least one (each alone or a mixture of two or more) of methyl (meth)acrylate, ethyl (meth)acrylate, propyl (meth)acrylate, isopropyl (meth)acrylate, n-butyl (meth)acrylate, isobutyl (meth)acrylate, t-butyl (meth)acrylate, hexyl (meth)acrylate, octyl (meth)acrylate, 2-ethylhexyl (meth)acrylate, lauryl (meth)acrylate, palmityl (meth)acrylate, stearyl (meth)acrylate, behenyl (meth)acrylate, styrene, and methyl styrene.

The aqueous monomer that can be used includes, for example, at least one (each alone or a mixture of two or more) of glycerin monomethacrylate, sodium 2-sulfoethyl methacrylate, polyethylene glycol monomethacrylate, polypropylene glycol monomethacrylate, polyethylene glycol-polypropylene glycol monomethacrylate, polyethylene glycol-tetramethylene glycol-monomethacrylate, and propylene glycol-polybutylene glycol-monomethacrylate.

The basic dye used in the present disclosure includes, for example, at least one of basic dyes such as di- and triarylmethane dyes; quinoneimine dyes such as azine dyes (including nigrosine), oxazine dyes, and thiazine dyes; xanthene dyes; dyes; triazoleazo thiazoleazo dyes; benzothiazoleazo dyes; azo dyes; methine dyes such as polymethine dyes, azomethine dyes, and azamethine dyes; anthraquinone dyes; and phthalocyanine dyes. Preferably, the water-soluble basic dyes are desired.

Specific examples of the basic dye that can be used include dyes of various colors with Nos. listed in COLOR INDEX, such as C. I. Basic Yellow (e.g., −1, −2, −9, −80), C. I. Basic Orange (e.g., −1, −2, −7, −34), C. I. Basic Red (e.g., −1, −2, −3, −53), C. I. Basic Violet (e.g., −1, −2, −3, −39), C. I. Basic Blue (e.g., −1, −2, −5, −88), C. I. Basic Green (e.g., −1, −4, −6, −10), C. I. Basic Brown (e.g., −1, −2, −4, −15), and C. I. Basic Black (e.g., −1, −2, −7, −8).

Further, commercially available products thereof can also be used, including AIZEN CATHILON YELLOW GLH (trade name by Hodogaya Chemical Co., Ltd.), and the like as yellow basic dyes; AIZEN CATHILON RED BLH, AIZEN CATHILON RED RH, and the like (all above are trade names by Hodogaya Chemical Co., Ltd.), Diacryl Supra Brilliant Red 2G and the like (trade name by Mitsubishi Chemical Corporation), Sumiacryl Red B (trade name by Sumitomo Chemical Co., Ltd.), and the like as red basic dyes; AIZEN CATHILON TURQUOISE BLUE LH (trade name by Hodogaya Chemical Co., Ltd.), and the like as blue basic dyes; Diacryl Supra Brilliant Green 2GL (trade name by Mitsubishi Chemical Corporation), and the like as green basic dyes; and Janus Brown R (trade name by Japan Chemical Co., Ltd.), AIZEN CATHILON BROWN GH (trade name by Hodogaya Chemical Co., Ltd.), and the like as brown basic dyes.

Furthermore, the oil-soluble dye used in the present disclosure includes commercially available monoazo, disazo, metal complex type monoazo, anthraquinone, phthalocyanine, and triarylmethane. Also, halochromic oil-soluble dyes obtained by substituting functional groups of acid and basic dyes with hydrophobic groups can be used as well.

Examples of the yellow halochromic oil-soluble dyes include C. I. Solvent Yellow 114 and 116; examples of the orange halochromic oil-soluble dyes include C. I. Solvent Orange 67; examples of the red halochromic oil-soluble dyes include C. I. Solvent Red 122 and 146; examples of the blue halochromic oil-soluble dyes include C. I. Solvent Blue 5, 36, 44, 63, 70, 83, 105, and 111; and examples of the black halochromic oil-soluble dyes include C. I. Solvent Black 3, 7, 27, and 29. Specific commercially available oil-soluble dyes include Blue Dye SBN Blue 701 (available from Hodogaya Chemical Co., Ltd.), Blue Dye Oil Blue 650 (available from Orient Chemical Industries Co., Ltd.), Blue Dye Savinyl Blue GLS (available from Clariant K.K.), Red Dye SOC-1-0100 (available from Orient Chemical Industries Co., Ltd.), OIL BLACK 860, OIL PINK 314, OIL YELLOW 3G, VALIFAST PINK 2310 N, VALIFAST RED 3312, VALIFAST YELLOW CGHN new, VALIFAST YELLOW 1108, and VALIFAST BLACK 3830 (available from Orient Chemical Industries Co., Ltd.). Note that known resin particles that are colored by using Solvent Red 49 of the OIL PINK 314 particularly tend to cause bleeding as time passes.

The terpene phenol resin used in the present disclosure is a resin obtained by reacting (copolymerizing) a cyclic terpene monomer and phenols in the presence of a catalyst, such as a Friedel-Crafts catalyst, the reaction form thereof is not particularly limited, and various terpene phenol resins that are obtained can be used. Examples thereof include a substance represented by the following Formula (I).

[Chem. 1]

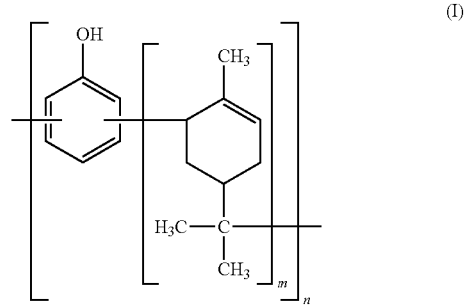

(I)

In Formula (I) above, m and n are positive numbers.

The terpene monomer, which is a raw material of the terpene phenol resin, to be used may be a monocyclic terpene monomer or may be a bicyclic terpene monomer. Specific examples of the cyclic terpene monomer, which is a raw material, include limonene, dipentene (optical isomer of limonene), terpinolene, α-pinene, β-pinene, terpinene, and menthadiene.

Examples of the phenols, which is a raw material of the terpene phenol resin, include phenol, cresol, xylenol, propylphenol, hydroquinone, resorcin, methoxyphenol, bromophenol, bisphenol A, and bisphenol F.

The terpene phenol resin to be used can be produced by, for example, performing a cationic polymerization reaction of 1 mol of terpene monomer and 0.1 to 50 mol of phenols in the presence of a catalyst such as a Friedel-Crafts catalyst at a temperature of −10 to 120° C. for 0.5 to 20 hours.

Reaction solvent does not need to be used; however, typically, solvents such as aromatic hydrocarbons, alcohols, and ethers may be used. As the terpene phenol resin produced as described above, various terpene phenol resins having weight average molecular weights (Mw) and softening points that are different to each other can be obtained based on the cyclic terpene monomer to be used, the type of phenols, and the used amounts. Furthermore, a hydrogenated terpene phenol resin obtained by adding hydrogen to these terpene phenol resins.

From the perspective of exhibiting better the effects of the present disclosure, a terpene phenol resin represented by Formula (I) above is desired.

Examples of the terpene phenol resin that can be used include those produced by the production methods described above, and commercially available YS POLYSTER T145, YS POLYSTER T130, YS POLYSTER K125, YS POLYSTER S145, YS POLYSTER N125, and MIGHTY ACE G150 available from Yasuhara Chemical Co., Ltd. Examples of the hydrogenated product of terpene phenol resin include commercially available YS POLYSTER UH available from Yasuhara Chemical Co., Ltd. One of these can be used alone, or two or more types of these can be mixed and used.

In the dispersion liquid of colored resin fine particles for an aqueous ink according to the present disclosure, the colored resin fine particles containing at least a cyclohexyl (meth)acrylate monomer, and a basic dye or an oil-soluble dye and containing a terpene phenol resin are dispersed in water. The dispersion liquid of colored resin fine particles can be produced by a production method, for example, by dissolving the basic dye or the oil-soluble dye described above in the cyclohexyl (meth)acrylate monomer described above or in a monomer mixture containing the cyclohexyl (meth)acrylate monomer described above and other hydrophobic vinyl monomers, then further blending the terpene phenol resin, and emulsion-polymerizing with a polymerization initiator such as ammonium persulfate, potassium persulfate or hydrogen peroxide, or, a polymerization initiator including a reducing agent in combination therewith. Further, can be used a crosslinking agent such as triallyl isocyanurate, triallyl isocyanurate, polyethylene glycol dimethacrylate, polypropylene glycol dimethacrylate, pentaerythritol acrylate, ditrimethylolpropane acrylate, dipentaerythritol acrylate, methoxylated bisphenol A methacrylate, pentaerythritol methacrylate, ditrimethylolpropane methacrylate, dipentaerythritol methacrylate, or ethoxylated polyglycerin methacrylate, and, if necessary, a polymerizable surfactant (emulsifier) such as ammonium polyoxyethylene-1-(allyloxymethyl)-alkyl ether sulfate, ether sulfate, ammonium polyoxyethylene nonylpropenylphenyl ether sulfate, polyoxyethylene nonylpropenylphenyl ether, ammonium polyacrylate, styrene-maleic acid copolymer ammonium, polyoxyethylene alkyl ether, polyoxyethylene styrenated phenyl ether, polyoxyethylene polyoxypropylene glycol, polyoxyalkylene decyl ether, polyoxyethylene tridecyl ether, alkyl benzene sulfonate, dioctyl sulfosuccinate, sodium lauryl sulfate, polyoxyethylene alkyl ether phosphoric ester, polyoxyethylene styrenated phenyl ether phosphoric ester, polyoxyethylene styrenated phenyl ether sulfate, or polyoxyethylene alkyl ether sulfate. The above-mentioned dyeing is carried out simultaneously with the polymerization, but the dyeing may be carried out by dissolving the basic dye or the oil-soluble dye after the polymerization.

When the above-mentioned crosslinking agent such as triallyl isocyanurate is used, heat resistance, mechanical properties, hydrolysis resistance, and weather resistance of the colored resin fine particles can be improved, which is preferable.

In the emulsion polymerization described above according to the present disclosure, a dicyclopenta(te)nyl (meth)acrylate monomer or the like may be further mixed with the mentioned cyclohexyl (meth)acrylate monomer or the like in an appropriate amount to carry out the emulsion polymerization. With the polymer obtained by further mixing the dicyclopenta(te)nyl (meth)acrylate monomer followed by the emulsion polymerization, even if a moisture in the dispersion liquid is volatilized, the stability is less likely to be impaired, and a dispersion liquid of colored resin fine particles for writing instruments having superior stability can be obtained.

The dicyclopenta(te)nyl (meth)acrylate monomer that can be used includes dicyclopentanyl acrylate monomer, dicyclopentenyl acrylate, dicyclopentanyl methacrylate monomer, and dicyclopentenyl methacrylate.

Furthermore, in carrying out the emulsion polymerization described above according to the present disclosure, in addition to the cyclohexyl (meth)acrylate monomer and other hydrophobic vinyl monomers descried above, and the dicyclopenta(te)nyl (meth)acrylate monomer, monomers having a reactive crosslinking group such as an epoxy group, a hydroxymethylamide group, and an isocyanate group, or a polyfunctional monomer having two or more vinyl groups may be blended in an appropriate amount for crosslinking.

In the present disclosure, in the polymerizable polymer components in the colored resin fine particles for writing instruments, the cyclohexyl (meth)acrylate monomer described above needs to be contained in an amount of 30 mass % or greater relative to the total polymer component in the colored resin fine particles, and is desired to be contained in an amount of preferably 30 to 95 mass %, and more preferably 30 to 70 mass %. Note that, in the present disclosure, the term "polymerizable polymer component" refers to a polymerizable component in the colored resin fine particles, and specifically, it refers to the total amount of the cyclohexyl (meth)acrylate monomer used, the other monomer components used, and the crosslinking agent described below.

When the content of the cyclohexyl (meth)acrylate monomer described above is 30 mass % or greater relative to the amount of the polymerizable polymer component, the effect of the present invention can be exhibited. On the other hand, when this content is less than 30 mass %, stability over time may be impaired, which is not preferable.

Furthermore, in the polymerizable polymer components in the colored resin fine particles for writing instruments, the content of the other monomer components except the cyclohexyl (meth)acrylate monomer is the remainder of the total amount of the cyclohexyl (meth)acrylate monomer used, the terpene phenol resin, and the crosslinking agent described below.

Preferably, the content of the other monomer components is desired to be 5 to 85 mass % relative to the amount of the polymerizable polymer component from the perspectives of further exhibiting the effects of the present invention, dispersibility, and reactivity.

In the present disclosure, from the perspectives of achieving color development and a sufficient density in a drawn line, stability, and the like, the content of the basic dye or the oil-soluble dye needs to be preferably 15 mass % or greater relative to the amount of the polymerizable polymer component, and the content thereof is preferably 15 to 50 mass %, and more preferably 15 to 40 mass %.

When the content of the dye is 15% or greater, satisfactory color development and a sufficient density in a drawn line can be exhibited. On the other hand, when the content of the dye is less than 15 mass %, the color development becomes insufficient.

More preferably, A/(A+B) is preferably 0.05 to 0.5, particularly preferably 0.2 to 0.4, where A is a content of the terpene phenol resin in the colored resin fine particles, and B is a content of the polymerizable polymer component in the colored resin fine particles, from the perspectives of suppressing bleeding of a drawn line due to bleeding of the dye and enhancing water resistance.

The polymerizable surfactant that can be used as necessary is not particularly limited as long as it is a polymerizable surfactant typically used in the emulsion polymerization described above. The polymerizable surfactant is, for example, an anionic or nonionic polymerizable surfactant, and includes at least one of ADEKA REASOAP NE-10, NE-20, NE-30, NE-40, and SE-10N available from ADEKA Corporation, LATEMUL S-180, S-180A, and S-120A available from Kao Corporation, ELEMINOL JS-20 available from Sanyo Chemical Industries, Ltd., and AQUALON KH-05, KH-10, HS-10, AR-10, and RN-10 available from DKS Co., Ltd. The used amount of the polymerizable surfactant is 0 to 50 mass %, and preferably 0.1 to 50 mass %, relative to the amount of the polymerizable polymer component.

Furthermore, the content of the crosslinking agent such as triallyl isocyanurate described above is 0 to 50 mass %, and preferably 0.1 to 25 mass %, relative to the amount of the polymerizable polymer component.

In the present disclosure, the dispersion liquid of the colored resin fine particles for writing instruments is obtained by the preferred embodiment described above, specifically, by at least dissolving the basic dye or the oil-soluble dye described above in the cyclohexyl (meth)acrylate monomer, blending the terpene phenol resin, and emulsion-polymerizing the mixture, or, by at least blending and polymerizing the terpene phenol resin in the mixed monomer containing the cyclohexyl (meth)acrylate monomer and the other monomer components, and then dissolving the basic dye or the oil-soluble dye to color it. The dispersion liquid of the colored resin fine particles is a coloring material that has better characteristics than before, such as good color development, excellent stability over time, and the like, and that does not cause bleeding in drawn lines due to the inclusion of the terpene phenol resin, and is useful as a coloring material for an aqueous ink composition that is suitable for writing instruments such as felt-tip pens, marking pens, ballpoint pens, and the like.

Also, in the present disclosure, an average particle size of the colored resin fine particles in the resulting dispersion liquid of the colored resin fine particles for writing instruments varies depending on the cyclohexyl (meth)acrylate monomer, the type of other monomers used, the contents, the polymerization conditions in the polymerization, and the like. The average particle size of the colored resin fine particles is preferably 20 to 300 nm, more preferably 40 to 150 nm, and even more preferably 60 to 110 nm.

When the average particle size is within the preferred range described above, a pen feed of a writing instrument such as a felt-tip pen, a marking pen, and a ballpoint pen is not clogged, and further, excellent storage stability is exhibited.

Note that the "average particle size" prescribed in the present disclosure is a histogram average particle size based on scattered light intensity distribution and, in the present invention (including Examples described below), is a value of D50 measured by using a particle size distribution measuring equipment [FPAR1000 (available from Otsuka Electronics Co., Ltd.)].

The aqueous ink composition for writing instruments of the present disclosure contains at least the dispersion liquid of the colored resin fine particles having the configuration described above, a water-soluble organic solvent, and water.

The water-soluble organic solvent that can be used includes, for example, at least one of alkylene glycols such as ethylene glycol, triethylene glycol, tetraethylene glycol, propylene glycol, dipropylene glycol, 1,2-propanediol, 1,3-propanediol, 1,2-butanediol, 2,3-butanediol, 1,3-butanediol, 1,4-butanediol, 1,2-pentanediol, 1,5-pentanediol, 2,5-hexanediol, 3-methyl-1,3-butanediol, 2-methylpentane-2,4-diol, 3-methylpentane-1,3,5-triol, and 1, 2, 3-hexanetriol; polyalkylene glycols such as polyethylene glycol and polypropylene glycol; glycerols such as glycerol, diglycerol, and triglycerol; lower alkyl ethers of glycols such as ethylene glycol monomethyl ether, ethylene glycol monoethyl ether, diethylene glycol monomethyl ether, diethylene glycol monoethyl ether, and diethylene glycol mono-n-butyl ether; N-methyl-2-pyrrolidone, or 1,3-dimethyl-2-imidalizinone.

In addition, water-soluble solvents such as alcohols such as methyl alcohol, ethyl alcohol, isopropyl alcohol, n-butyl alcohol, tert-butyl alcohol, isobutyl alcohol, hexyl alcohol, octyl alcohol, nonyl alcohol, decyl alcohol, benzyl alcohol, and amides such as dimethylformamide and diethylacetamide, and ketones such as acetone may also be mixed. The content of these water-soluble organic solvents varies depending on the type of writing instrument such as a felt-tip pen, a marking pen, or a ball-point pen, and is 1 to 40 massy relative to the total amount of the ink composition.

The content of water (for example, tap water, purified water, ion-exchanged water, distilled water, or pure water) is preferably from 30 to 90 mass %, and more preferably from 40 to 60 mass %, based on the total amount of the ink composition.

Also, the content of the colored resin fine particles varies depending on the type of writing instruments, the outflow mechanism (pen feed, ballpoint pen), and the like. The solid content of the colored resin fine particles is preferably 1 to 30 mass % relative to the total amount of the aqueous ink composition for writing instruments.

In the aqueous ink composition for writing instruments of the present disclosure, a preservative or a fungicide, a pH modifier, a defoamer, and the like can be appropriately selected and used, as necessary, as long as the effects of the present disclosure are not impaired. Examples of the pH adjuster include at least one of ammonia, urea, monoethanolamine, diethanolamine, triethanolamine, aminomethylpropanol, alkali metal salts of carbonic acid or phosphoric acid such as sodium carbonate and sodium tripolyphosphate, and alkali metal hydroxides such as sodium hydroxide.

Examples of the preservative or fungicide include at least one of phenol, omadine sodium, sodium pentachlorophenol, 1,2-benzisothiazolin-3-one, 2,3,5,6-tetrachloro-4-(methylphonyl)pyridine, alkali metal salts of benzoic acid, sorbic acid, and dehydroacetic acid, or benzimidazole compounds.

Examples of lubricant include at least one of phosphoric acid esters, polyalkylene glycol derivatives such as polyoxyethylene lauryl ether, fatty acid alkali salts, nonionic surfactants, fluorinated surfactants such as perfluoroalkyl phosphate esters, or polyether modified silicones such as polyethylene glycol adduct of dimethylpolysiloxane.

The aqueous ink composition for writing instruments of the present disclosure can be prepared by appropriately combining at least the dispersion liquid of colored resin fine particles for an aqueous ink having the configuration described above, a water-soluble solvent, and other components depending on the application of ink for writing instruments (for ballpoint pens, marking pens, etc.), and then mixing those combined with stirring using a stirrer such as a homomixer, a homogenizer or a disperser, and if necessary, further filtering or centrifuging the mixture to remove coarse particles in the ink composition.

The writing instrument of the present disclosure is loaded with the aqueous ink composition for writing instruments having the above-mentioned composition, and examples thereof include a ballpoint pen, a marking pen, and the like provided with a pen tip such as a ballpoint pen tip, a fiber tip, a felt tip, a plastic tip, a fiber feeder, and a porous feeder.

The ballpoint pen includes an instrument where the aqueous ink composition for a writing instrument having the above-mentioned composition is accommodated in an ink container (refill) for a ballpoint pen, and where a material which is not compatible with the aqueous ink composition for a writing instrument having the above-mentioned composition accommodated in the ink container and which has a small specific gravity with respect to the aqueous ink composition, for example, polybutene, silicone oil, and mineral oil is accommodated as an ink follower.

Note that the structures of the ballpoint pen and the marking pen are not particularly limited, and the ballpoint pen and the marking pen may be, for example, a direct liquid type pen provided with a collector structure (ink holding mechanism) using a shaft cylinder itself as an ink container in which the shaft cylinder is filled with the aqueous ink composition for writing instruments having the configuration described above.

The aqueous ink composition for writing instruments of the present disclosure configured as described above contains at least the dispersion liquid of colored resin fine particles for writing instruments having the described configuration, the water-soluble solvent, and water. As a result, the aqueous ink composition for writing instruments that is suitable for writing instruments such as felt-tip pens, marking pens, and ballpoint pens having a sufficient density in drawn lines and excellent stability over time is obtained.

EXAMPLES

Next, the present invention will be described in more detail with respect to Production Examples, Examples and Comparative Examples, but the present invention is not limited to the following Examples.

Production Examples 1 to 10: Production of dispersion liquid of colored resin fine particles (particles 1 to 10)

Dispersion liquids of colored resin fine particles were produced using the following Production Examples 1 to 10. Note that the term "parts" below refers to parts by mass.

Production Example 1

A 2-liter flask equipped with a stirrer, a reflux condenser, a thermometer, a nitrogen gas-inlet, and a 1000 mL separating funnel for addition of a monomer was set in a hot water bath, and charged with 325.5 parts of distilled water, 5 parts of glycerin monomethacrylate (BLEMMER GLM, available from NOF Corporation), 5 parts of sodium 2-sulfoethyl methacrylate (acrylic ester SEM-Na, available from Mitsubishi Chemical Corporation), 20 parts of a polymerizable surfactant (ADEKA REASOAP SE-10N, available from ADEKA Corporation, ether sulfate), and 0.5 parts of ammonium persulfate, and the internal temperature was raised to 50° C. while nitrogen gas was introduced.

On the other hand, 20 parts of an oil-soluble dye (VALIFAST PINK 2310N, available from Orient Chemical Industries Co., Ltd.), 12 parts of an oil-soluble dye (OIL PINK 314, available from Orient Chemical Industries Co., Ltd.), and 12 parts of an oil-soluble dye (VALIFAST RED 3312, available from Orient Chemical Industries Co., Ltd.) as dyes, 10 parts of a crosslinking agent (triallyl isocyanurate, TAIC, available from Nippon Kasei Chemical Company Limited), and 28 parts of a terpene phenol resin (YS POLYSTER N125, available from Yasuhara Chemical Co., Ltd.) were mixed with a mixed monomer including 55 parts of cyclohexyl methacrylate monomer and 35 parts of n-butyl methacrylate as the other monomer, and thus a solution was prepared.

The prepared solution was added to the flask maintained at a temperature of about 50° C. from the separatory funnel over 3 hours with stirring to carry out emulsion polymerization. Furthermore, the solution was aged for 5 hours to terminate the polymerization, and thus a dispersion liquid of colored resin fine particles for writing instruments (particle 1) was obtained.

The content of the cyclohexyl methacrylate monomer was 55 mass % relative to the polymerizable polymer component forming the colored resin fine particles, and the content of the oil-soluble dye was 44 mass % relative to the polymerizable polymer component. A/(A+B) was 0.22, where A was the content of the terpene phenol resin in the colored resin fine particles, and B is the content of the polymerizable polymer component in the colored resin fine particles. The average particle size of the colored resin fine particles was 101 nm.

Production Example 2

An aqueous dispersion liquid of colored resin fine particles for writing instruments (particle 2) was obtained in the same manner as in Production Example 1 described above except for changing the amount of the distilled water in Production Example 1 described above to 304.5 parts, changing the amount of the cyclohexyl methacrylate monomer to 30 parts, changing the amount of the n-butyl methacrylate to 45 parts, using 40 parts of the oil-soluble dye (Savinyl Blue GLS, available from Clariant K.K.) as the dye, and using 40 parts of terpene phenol resin (YS POLYSTER N125, available from Yasuhara Chemical Co., Ltd.).

The content of the cyclohexyl methacrylate monomer was 35 mass % relative to the amount of the polymerizable polymer component in the colored resin fine particles, the content of the oil-soluble dye was 47 mass % relative to the polymerizable polymer component, and the A/(A+B) described above was 0.32. The colored resin fine particles had an average particle size of 123 nm.

Production Example 3

An aqueous dispersion liquid of colored fine particles for writing instruments (particle 3) was obtained in the same manner as in Production Example 1 described above, except for changing the amount of the distilled water in Production Example 1 described above to 318.5 parts, changing the amount of cyclohexyl methacrylate monomer to 60 parts, changing the amount of n-butyl methacrylate to 30 parts, using 25 parts of an oil-soluble dye (Spilon Yellow CGNH New, available from Hodogaya Chemical Co., Ltd.) and using 11 parts of an oil-soluble dye (VALIFAST YELLOW 1109, available from Orient Chemical Industries Co., Ltd.) as dyes, and using 15 parts of terpene phenol resin (YS POLYSTER N125, available from Yasuhara Chemical Co., Ltd.).

The content of the cyclohexyl methacrylate monomer was 60 mass % relative to the amount of the polymerizable polymer component in the colored resin fine particles, the content of the oil-soluble dye was 36 mass % relative to the polymerizable polymer component, and the A/(A+B) described above was 0.13. The colored resin fine particles had an average particle size of 98 nm.

Production Example 4

An aqueous dispersion liquid of colored resin fine particles for writing instruments (particle 4) was obtained in the same manner as in Production Example 1 described above except for changing the amount of the distilled water in Production Example 1 described above to 281.5 parts, changing the amount of cyclohexyl methacrylate monomer to 60 parts, changing the amount of n-butyl methacrylate to 35 parts, using 10 parts of an oil-soluble dye (VALIFAST RED 3312, available from Orient Chemical Industries Co., Ltd.), 25 parts of an oil-soluble dye (VALIFAST BLACK 1821, available from Orient Chemical Industries Co., Ltd.), and 10 parts of an oil-soluble dye (VALIFAST YELLOW 129, available from Orient Chemical Industries Co., Ltd.) as the dyes, and using 28 parts of terpene phenol resin (YS POLYSTER K125, available from Yasuhara Chemical Co., Ltd.).

The content of the cyclohexyl methacrylate monomer was 57 mass % relative to the amount of the polymerizable polymer component in the colored resin fine particles, the content of the oil-soluble dye was 43 mass % relative to the polymerizable polymer component, and the A/(A+B) described above was 0.21. The colored resin fine particles had an average particle size of 104 nm.

Production Example 5

An aqueous dispersion liquid of colored resin fine particles for writing instruments (particle 5) was obtained in the same manner as in Production Example 4 described above except for changing the amount of terpene phenol resin (YS POLYSTER K125, available from Yasuhara Chemical Co., Ltd.) in Production Example 4 described above to 38 parts.

The content of the cyclohexyl methacrylate monomer was 57 mass % relative to the amount of the polymerizable polymer component in the colored resin fine particles, the content of the oil-soluble dye was 43 mass % relative to the polymerizable polymer component, and the A/(A+B) described above was 0.27. The colored resin fine particles had an average particle size of 126 nm.

Production Example 6

An aqueous dispersion liquid of colored resin fine particles for writing instruments (particle 6) was obtained in the same manner as in Production Example 4 described above except for changing the amount of terpene phenol resin (YS POLYSTER K125, available from Yasuhara Chemical Co., Ltd.) in Production Example 4 described above to 17 parts.

The content of the cyclohexyl methacrylate monomer was 57 mass % relative to the amount of the polymerizable polymer component in the colored resin fine particles, the content of the oil-soluble dye was 43 mass % relative to the polymerizable polymer component, and the A/(A+B) described above was 0.14. The colored resin fine particles had an average particle size of 91 nm.

Production Example 7

An aqueous dispersion liquid of colored resin fine particles for writing instruments (particle 7) was obtained in the same manner as in Production Example 1 described above except for changing 28 parts of the terpene phenol resin (YS POLYSTER N125, available from Yasuhara Chemical Co., Ltd.) in Production Example 1 described above to 28 parts of terpene phenol resin (MIGHTY ACE G150, available from Yasuhara Chemical Co., Ltd.).

The content of the cyclohexyl methacrylate monomer was 55 mass % relative to the amount of the polymerizable polymer component in the colored resin fine particles, the content of the oil-soluble dye was 44 mass % relative to the polymerizable polymer component, and the A/(A+B) described above was 0.22. The colored resin fine particles had an average particle size of 109 nm.

Production Example 8

An aqueous dispersion liquid of colored resin fine particles for writing instruments (particle 8) was obtained in the same manner as in Production Example 1 described above except for changing 28 parts of the terpene phenol resin (YS POLYSTER N125, available from Yasuhara Chemical Co., Ltd.) in Production Example 1 described above to 28 parts of terpene phenol resin (YS POLYSTER T145, available from Yasuhara Chemical Co., Ltd.).

The content of the cyclohexyl methacrylate monomer was 55 mass % relative to the amount of the polymerizable polymer component in the colored resin fine particles, the content of the oil-soluble dye was 44 mass % relative to the polymerizable polymer component, and the A/(A+B) described above was 0.22. The colored resin fine particles had an average particle size of 113 nm.

Production Example 9

An aqueous dispersion liquid of colored resin fine particles for writing instruments (particle 9) was obtained in the same manner as in Production Example 1 described above except for changing 28 parts of the terpene phenol resin (YS POLYSTER N125, available from Yasuhara Chemical Co., Ltd.) in Production Example 1 described above to 28 parts of terpene phenol resin (YS POLYSTER UH, available from Yasuhara Chemical Co., Ltd.).

The content of the cyclohexyl methacrylate monomer was 55 mass % relative to the amount of the polymerizable polymer component in the colored resin fine particles, the content of the oil-soluble dye was 44 mass % relative to the polymerizable polymer component, and the A/(A+B) described above was 0.22. The colored resin fine particles had an average particle size of 99 nm.

Production Example 10

An aqueous dispersion liquid of colored resin fine particles for writing instruments (particle 10) was obtained in the same manner as in Production Example 1 described above except for using no terpene phenol resin in Production Example 1 (content: 0) (YS POLYSTER N125, available from Yasuhara Chemical Co., Ltd.) described above.

The content of the cyclohexyl methacrylate monomer was 55 mass % relative to the amount of the polymerizable polymer component in the colored resin fine particles, the content of the oil-soluble dye was 44 mass % relative to the polymerizable polymer component, and the A/(A+B) described above was 0. The colored resin fine particles had an average particle size of 104 nm.

The dispersion liquids of colored resin fine particles for writing instruments obtained in Production Examples 1 to10 described above had a resin solid content of 20 to 40 mass %.

Examples 1 to 9 and Comparative Example 1: Preparation of Aqueous Ink Composition for Writing Instrument Each of the dispersion liquids of colored resin fine particles (particles 1 to 10) produced in Production Examples 1 to 10 were used to prepare each of the aqueous ink compositions for writing instruments by an ordinary method according to the blend composition (total amount: 100 mass %) described below.

Ink composition (Total amount: 100 mass %)

Each dispersion liquid of colored resin fine particles for an aqueous ink 50 mass % pH modifier (triethanolamine) 1 masso

Water-soluble organic solvent (ethylene glycol) 5 mass %

Ion exchanged water 44 mass %

Bleeding of each of the obtained aqueous ink compositions for writing instruments (total amount: 100 mass %) was evaluated by the following evaluation method.

The evaluation results of Examples 1 to 9 and Comparative Example 1 are shown in the following Table 1.

Bleeding Test Method

By using a marking pen (PIN-05, available from Mitsubishi Pencil Co., Ltd.) charged with each of the ink compositions obtained in Examples 1 to 9 and Comparative Example 1, a circle with a diameter of approximately 5 cm was drawn on PPC paper. After this PPC paper was allowed to stand still at 50° C. for one month, the condition of the drawn line was evaluated based on the following evaluation criteria.

Evaluation criteria:

A: No bleeding was observed.

B: Slight bleeding was observed.

C: Bleeding was clearly observed.

TABLE 1

|  | Examples |  |  |  |  |  |  |  |  | Comparative Example |
|---|---|---|---|---|---|---|---|---|---|---|
|  | 1 | 2 | 3 | 4 | 5 | 6 | 7 | 8 | 9 | 1 |
| Production Example | 1 | 2 | 3 | 4 | 5 | 6 | 7 | 8 | 9 | 10 |
| Evaluation | A | A | B | A | A | B | A | A | B | C |

To discuss the results shown in Table 1, it was confirmed that Examples 1 to 9, which were in the scope of the present disclosure, exhibited superior writing performance without bleeding even after time passed compared to Comparative Example 1, which was not in the scope of the present disclosure.

INDUSTRIAL APPLICABILITY

The aqueous ink composition for writing instruments suitable for use in writing instruments, such as felt-tip pens, marking pens, and ballpoint pens, is provided.

The invention claimed is:

1. An aqueous ink composition for a writing instrument, the aqueous ink composition comprising:
   an aqueous dispersion of colored resin fine particles, the colored resin fine particles comprising a polymerized form of a cyclohexyl (meth)acrylate monomer, and
   a basic dye or an oil-soluble dye,
   wherein the cyclohexyl (meth)acrylate monomer is used in an amount of 30 mass % or greater, relative to an amount of a polymerizable polymer component in the colored resin fine particles,
   wherein the colored resin fine particles further comprise a terpene phenol resin, and
   wherein an (A)/((A)+(B)) mass ratio, of a content of the terpene phenol resin in the colored resin fine particles (A) to a sum of (A) and a content of the polymerizable polymer component forming the colored resin fine particles (B), is in a range of from 0.05 to 0.5.

2. The aqueous ink composition of claim 1, satisfying that wherein the (A)/((A)+(B)) mass ratio is in a range of from 0.2 to 0.5.

3. The aqueous ink composition of claim 1, wherein the cyclohexyl (meth)acrylate monomer is used in a range of from 30 mass % to 95 mass %, relative to an amount of the polymerizable polymer component forming the colored resin fine particles.

4. The aqueous ink composition of claim 1, wherein the colored resin fine particles have an average particle size in a range of from 20 to 300 nm.

5. The aqueous ink composition of claim 1, wherein the (A)/((A)+(B)) mass ratio is in a range of from 0.2 to 0.4.

6. The aqueous ink composition of claim 1, comprising the basic dye or the oil-soluble dye in 15 mass % or greater, relative to the amount of the polymerizable polymer component.

7. The aqueous ink composition of claim 1, comprising the basic dye or the oil-soluble dye in a range of from 15 to 50 mass %, relative to the amount of the polymerizable polymer component.

8. The aqueous ink composition of claim 1, comprising the basic dye or the oil-soluble dye in a range of from 15 to 40 mass %, relative to the amount of the polymerizable polymer component.

9. The aqueous ink composition of claim 1, wherein the colored resin fine particles have an average particle size in a range of from 40 to 150 nm.

10. The aqueous ink composition of claim 1, wherein the colored resin fine particles have an average particle size in a range of from 60 to 110 nm.

11. The aqueous ink composition of claim 1, comprising water in a range of from 30 to 90 mass %, based on a total mass of the aqueous ink composition.

12. The aqueous ink composition of claim 1, comprising water in a range of from 40 to 60 mass %, based on a total mass of the aqueous ink composition.

13. The aqueous ink composition of claim 1, wherein the polymerizable polymer component further comprises a hydrophobic vinyl monomer.

14. The aqueous ink composition of claim 1, wherein the polymerizable polymer component further comprises styrene.

15. The aqueous ink composition of claim 1, wherein the polymerizable polymer component further comprises methyl styrene.

16. The aqueous ink composition of claim 1, wherein the polymerizable polymer component further comprises methyl (meth)acrylate, ethyl (meth)acrylate, propyl (meth)acrylate, isopropyl (meth)acrylate, n-butyl (meth)acrylate, isobutyl (meth)acrylate, t-butyl (meth)acrylate, hexyl (meth)acrylate, octyl (meth)acrylate, 2-ethylhexyl (meth)acrylate, lauryl (meth)acrylate, palmityl (meth)acrylate, stearyl (meth)acrylate, behenyl (meth)acrylate, styrene, methyl styrene, glycerin monomethacrylate, sodium 2-sulfoethylmethacrylate, polyethylene glycol monomethacrylate, polypropylene glycol monomethacrylate, polyethylene glycol-polypropylene glycol monomethacrylate, polyethylene glycol-tetramethylene glycol-monomethacrylate, propylene glycol-polybutylene glycol-monomethacrylate, or a mixture of two or more of any of these.

17. A writing instrument, comprising:
the aqueous ink composition of claim 1.

18. A felt-tip pen, comprising:
the aqueous ink composition of claim 1.

19. A marking pen, comprising:
the aqueous ink composition of claim 1.

20. A ball-point pen, comprising:
the aqueous ink composition of claim 1.

* * * * *